(12) United States Patent
Mollyn

(10) Patent No.: US 7,869,432 B1
(45) Date of Patent: Jan. 11, 2011

(54) PEER-TO-PEER LINK AGGREGATION ACROSS A SERVICE PROVIDER NETWORK

(75) Inventor: Suresh Mollyn, Bangalore (IN)

(73) Assignee: Force 10 Networks, Inc, San Jose, CA (US)

(*) Notice: Subject to any disclaimer, the term of this patent is extended or adjusted under 35 U.S.C. 154(b) by 677 days.

(21) Appl. No.: 11/824,207

(22) Filed: Jun. 29, 2007

(51) Int. Cl.
H04L 12/28 (2006.01)
G06F 15/173 (2006.01)

(52) U.S. Cl. .................. 370/389; 370/351; 370/386; 370/392; 370/401; 370/395.3; 370/221; 370/235; 370/257; 370/445; 709/239; 709/240

(58) Field of Classification Search ......... 370/221–503; 709/238–244
See application file for complete search history.

(56) References Cited

U.S. PATENT DOCUMENTS

| 6,819,680 | B2* | 11/2004 | Hickman et al. | 370/475 |
|---|---|---|---|---|
| 6,970,419 | B1* | 11/2005 | Kalkunte et al. | 370/230 |
| 6,970,420 | B1* | 11/2005 | Kalkunte et al. | 370/230 |
| 6,973,031 | B1* | 12/2005 | Kalkunte et al. | 370/230 |
| 6,977,892 | B2* | 12/2005 | Kalkunte et al. | 370/230 |
| 7,315,554 | B2* | 1/2008 | Baum et al. | 370/469 |
| 7,327,748 | B2* | 2/2008 | Montalvo et al. | 370/412 |
| 7,345,991 | B1* | 3/2008 | Shabtay et al. | 370/221 |
| 7,447,204 | B2* | 11/2008 | Narvaez | 370/389 |
| 7,545,740 | B2* | 6/2009 | Zelig et al. | 370/230 |
| 7,580,417 | B2* | 8/2009 | Ervin et al. | 370/397 |
| 7,646,770 | B1* | 1/2010 | Parker | 370/392 |
| 2001/0030962 | A1* | 10/2001 | Song et al. | 370/389 |
| 2002/0131437 | A1* | 9/2002 | Tagore-Brage | 370/419 |
| 2003/0202472 | A1* | 10/2003 | Kalkunte et al. | 370/235 |
| 2006/0098573 | A1* | 5/2006 | Beer et al. | 370/230 |
| 2006/0251074 | A1* | 11/2006 | Solomon | 370/392 |
| 2007/0268931 | A1* | 11/2007 | Shaikli | 370/468 |
| 2007/0280258 | A1* | 12/2007 | Rajagopalan et al. | 370/395.3 |
| 2008/0074996 | A1* | 3/2008 | Fourcand | 370/225 |
| 2008/0181196 | A1* | 7/2008 | Regan et al. | 370/351 |
| 2008/0291826 | A1* | 11/2008 | Licardie et al. | 370/230 |

* cited by examiner

*Primary Examiner*—Ayaz R Sheikh
*Assistant Examiner*—Venkatesh Haliyur
(74) *Attorney, Agent, or Firm*—Robert Schuler (57) ABSTRACT

A virtual link aggregation-capable service provider network and network edge device are described. In at least one embodiment, the service provider edge devices forward packets across the service provider network between pairs of customer ports, including link aggregation packets that would ordinarily be consumed by the edge device. This allows the customer to bridge a link aggregation across a service provider network. Other embodiments are also described and claimed.

9 Claims, 11 Drawing Sheets

| LACPDU STRUCTURE | OCTETS |
|---|---|
| DESTINATION ADDRESS | 6 |
| SOURCE ADDRESS | 6 |
| LENGTH/TYPE | 2 |
| SUBTYPE = LACP | 1 |
| VERSION NUMBER | 1 |
| TLV_TYPE = ACTOR INFORMATION | 1 |
| ACTOR_INFORMATION_LENGTH = 20 | 1 |
| ACTOR_SYSTEM_PRIORITY | 2 |
| ACTOR_SYSTEM | 6 |
| ACTOR_KEY | 2 |
| ACTOR_PORT_PRIORITY | 2 |
| ACTOR_PORT | 2 |
| ACTOR_STATE | 1 |
| RESERVED | 3 |
| TLV_TYPE = PARTNER INFORMATION | 1 |
| PARTNER_INFORMATION_LENGTH = 20 | 1 |
| PARTNER_SYSTEM_PRIORITY | 2 |
| PARTNER_SYSTEM | 6 |
| PARTNER_KEY | 2 |
| PARTNER_PORT_PRIORITY | 2 |
| PARTNER_PORT | 2 |
| PARTNER_STATE | 1 |
| RESERVED | 3 |
| TLV_TYPE = COLLECTOR INFORMATION | 1 |
| COLLECTOR_INFORMATION_LENGTH = 16 | 1 |
| COLLECTORMAXDELAY | 2 |
| RESERVED | 12 |
| TLV_TYPE = TERMINATOR | 1 |
| TERMINATOR_LENGTH = 0 | 1 |
| RESERVED | 50 |
| FCS | 4 |

PEER-TO-PEER LINK AGGREGATION ACROSS A SERVICE PROVIDER NETWORK

BACKGROUND

1. Field of the Invention

The present disclosure relates generally to link aggregation, and more particularly to systems and methods for implementing link aggregation between two peers connected by a service provider network.

2. Description of Related Art

Link aggregation refers to a process for operating a group of physical links as if they were a single link. At least one standard for link aggregation has been promulgated by the Institute of Electrical and Electronic Engineers, e.g., in the IEEE 802.3-2005 standard, Section 43 and Annexes 43A-C, incorporated herein by reference.

Figure 1:
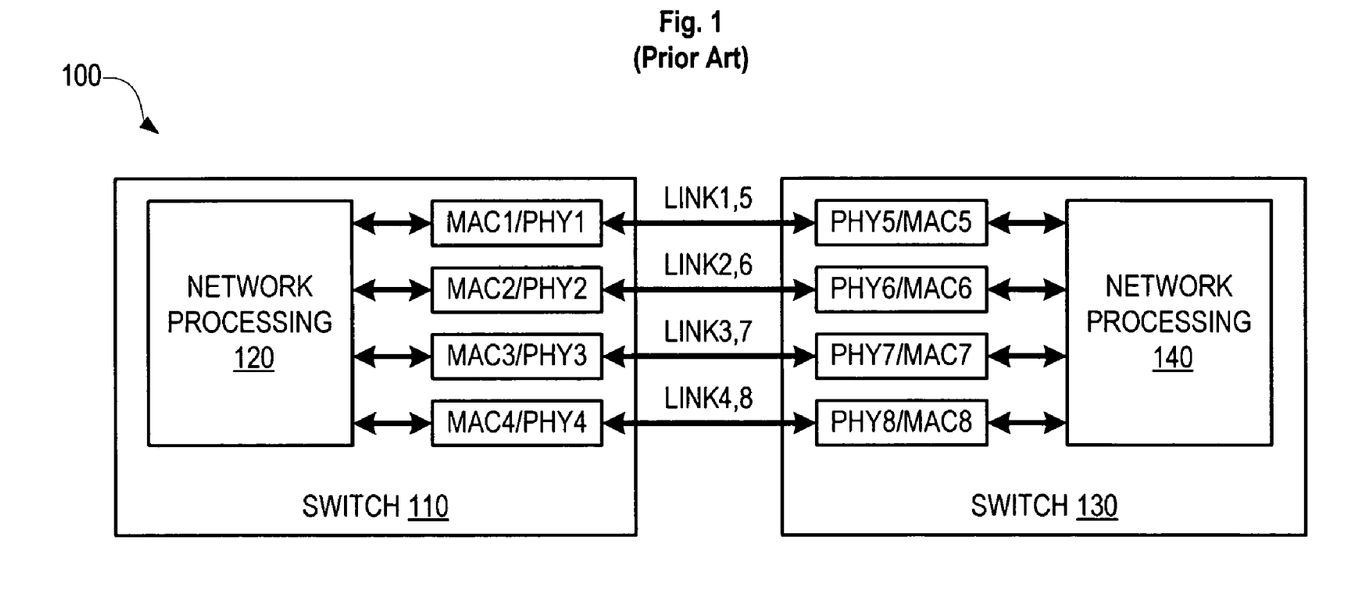
FIG. 1 illustrates a prior art network configuration comprising two switches connected by multiple aggregated physical links.

FIG. 1 illustrates one network configuration 100 to which link aggregation is applicable. A first switch 110 comprises four physical layer transponders PHY1-PHY4 communicating respectively with four Media Access Control (MAC) link layer devices MAC1-MAC4. Each MAC communicates frame data with network processing 120. A second switch 130 comprises a similar configuration of four physical layer transponders PHY5-PHY8, four MAC link layer devices MAC5-MAC8, and network processing 140. Each switch will generally include other PHYs and MACs (not shown) for other ports that are not part of the potential link aggregation group between switches 110 and 130.

Switch 110 and switch 130 are connected by four full-duplex physical links. PHY1 and PHY5 communicate over a link LINK1,5. P1-W2 and PHY6 communicate over a link LINK2,6. PHY3 and PHY7 communicate over a link LINK3, 7. PHY4 and PHY8 communicate over a link LINK4,8. Each of these four links can be operated independently, which may be advantageous, for example, in a multiple spanning tree configuration. Alternately, if network processing 120 and network processing 140 possess hardware and/or software necessary to support link aggregation, they can negotiate the aggregation of two (or more) links connecting switches 110 and 130 to a common logical link that appears as a single, faster link.

Figure 2:
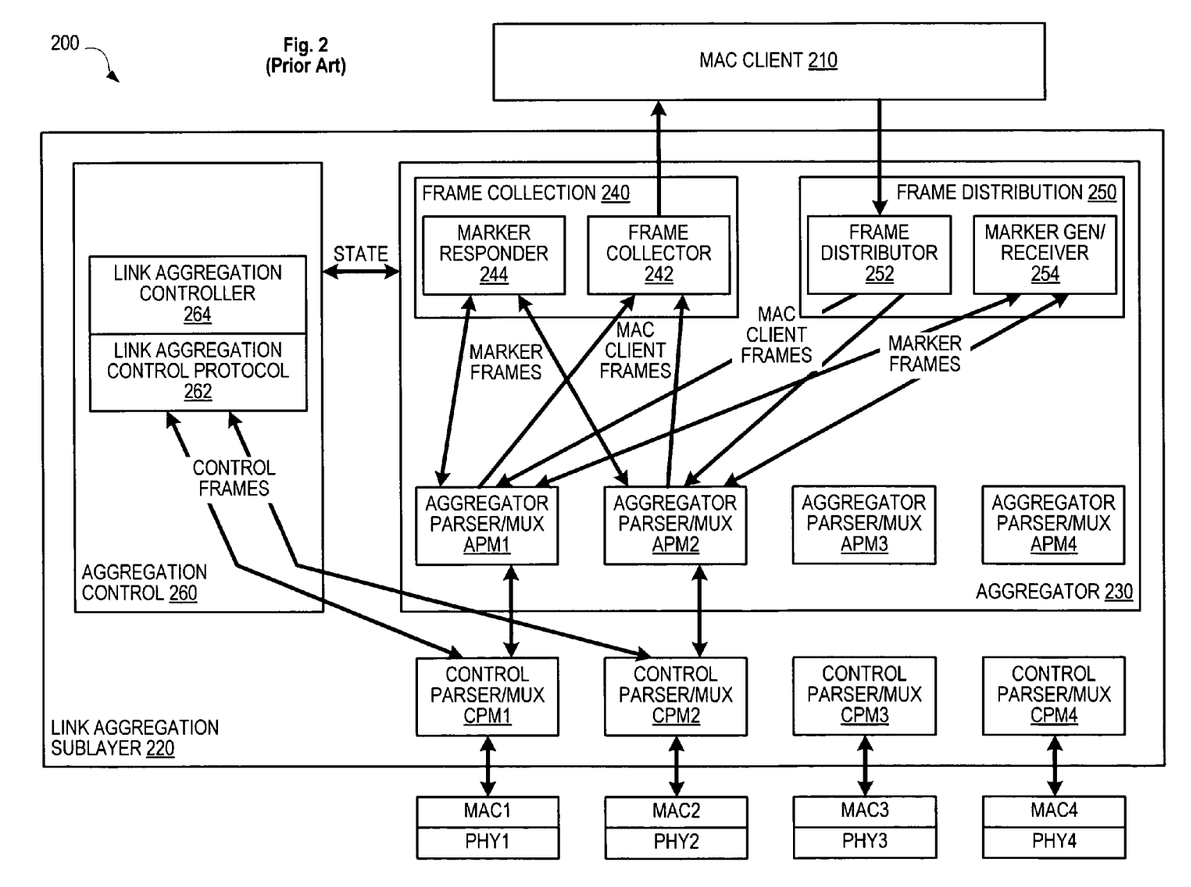
FIG. 2 illustrates a prior art IEEE 802.3 link aggregation sublayer configuration.

A short summary of pertinent link aggregation terminology and concepts from the IEEE 802.3-2005 standard is presented. Referring to FIG. 2, several logical components of a packet network device 200 are shown, including a Media Access Control (MAC) client 210, a link aggregation sublayer 220, four individual MACs MAC1-MAC4, and four individual physical layer transponders (PHYs) PHY1-PHY4. The purpose of the link aggregation sublayer 220 is to combine a number of physical ports (represented by MACn/PHYn) logically for presentation to MAC client 210 as a single logical MAC. More or less than four physical ports are supportable by the framework, with up to the same number of MAC clients as physical ports supportable as well.

Link aggregation sublayer 220 is further subdivided into several logical components, including control parser/multiplexers (muxes) CPM1-CPM4, an aggregator 230, and aggregation control 260.

Each control parser/mux CPMn couples to a corresponding MAC MACn across an IEEE 802.3 MAC service interface. For egress frames (transmitted by one of the PHYs), each control parser/mux passes frame transmission requests from aggregator 230 and aggregation control 260 to the appropriate port. For ingress frames (received by one of the PHYs), each control parser/mux distinguishes Link Aggregation Control (LAC) Protocol Data Units (PDUs) from other frames, and passes the LACPDUs to aggregation control 260, with all other frames passing to aggregator 230. It is noted that although one aggregator 230 is shown, in the particular implementation shown in FIG. 2 there could be up to four aggregators—each control parser/mux CPMn passes its non-LACPDU ingress traffic to a particular aggregator bound to MACn, or discards the non-LACPDU traffic when MACn is not bound to an aggregator.

Aggregator 230 comprises a frame collection block 240, a frame distribution block 250, and up to four (in this embodiment) aggregator parser/muxes APM1-APM4. Aggregator 230 communicates with MAC client 210 across an IEEE 802.3 MAC service interface. Aggregator 230 also communicates with each control parser/mux CPMn that corresponds to a MAC MACn bound to aggregator 230.

Frame collection block 240 comprises a frame collector 242 and a marker responder 244. The frame collector 242 receives ordinary traffic frames from each bound MAC MACn and passes these frames to MAC client 210. Frame collector 242 is not constrained as to how it multiplexes frames from its bound ports, other than it is not allowed to reorder frames received on any one port. The marker responder 244 receives marker frames (as defined in IEEE 802.3-2005) from each bound port and responds with a return marker frame to the port that received the ingress marker frame.

Frame distribution block 250 comprises a frame distributor 252 and an optional marker generator/receiver 254. The frame distributor 252 receives ordinary traffic frames from MAC client 210, and employs a frame distribution algorithm to distribute the frames among the ports bound to the aggregator. Frame distributor 252 is not constrained as to how it distributes frames to its bound ports, other than that it is expected to supply frames from the same "conversation" to the same egress port. Marker generator/receiver 254 can be used, e.g., to aid in switching a conversation from one egress port to another egress port. Frame distribution 250 holds or discards any incoming frames for the conversation while marker generator/receiver 254 generates a marker frame on the port handling the conversation. When a return marker frame is received, all in-transit frames for the conversation have been received at the far end of the aggregated link, and frame distribution may switch the conversation to a new egress port.

Aggregator parser/muxes APM1-APM4, when bound to one of the physical ports, transfer frames with their corresponding control parser/mux CPM1-CPM4. On transmit, aggregator parser/muxes APM1-APM4 takes egress frames (ordinary traffic and marker frames) from frame distribution 250 and marker responder 244 and supply them to their respective bound ports. For ingress frames received from their bound port, each aggregator parser/mux distinguishes ordinary MAC traffic, marker request frames, and marker response frames, passing each to frame collector 242, marker responder 244, and marker generator/receiver 254, respectively.

Aggregation control 260 is responsible for configuration and control of link aggregation for its assigned physical ports. Aggregation control 260 comprises a link aggregation control protocol (LACP) handler that is used for automatic communication of aggregation capabilities and status among systems, and a link aggregation controller 264 that allows automatic control of aggregation and coordination with other systems.

Figure 3:
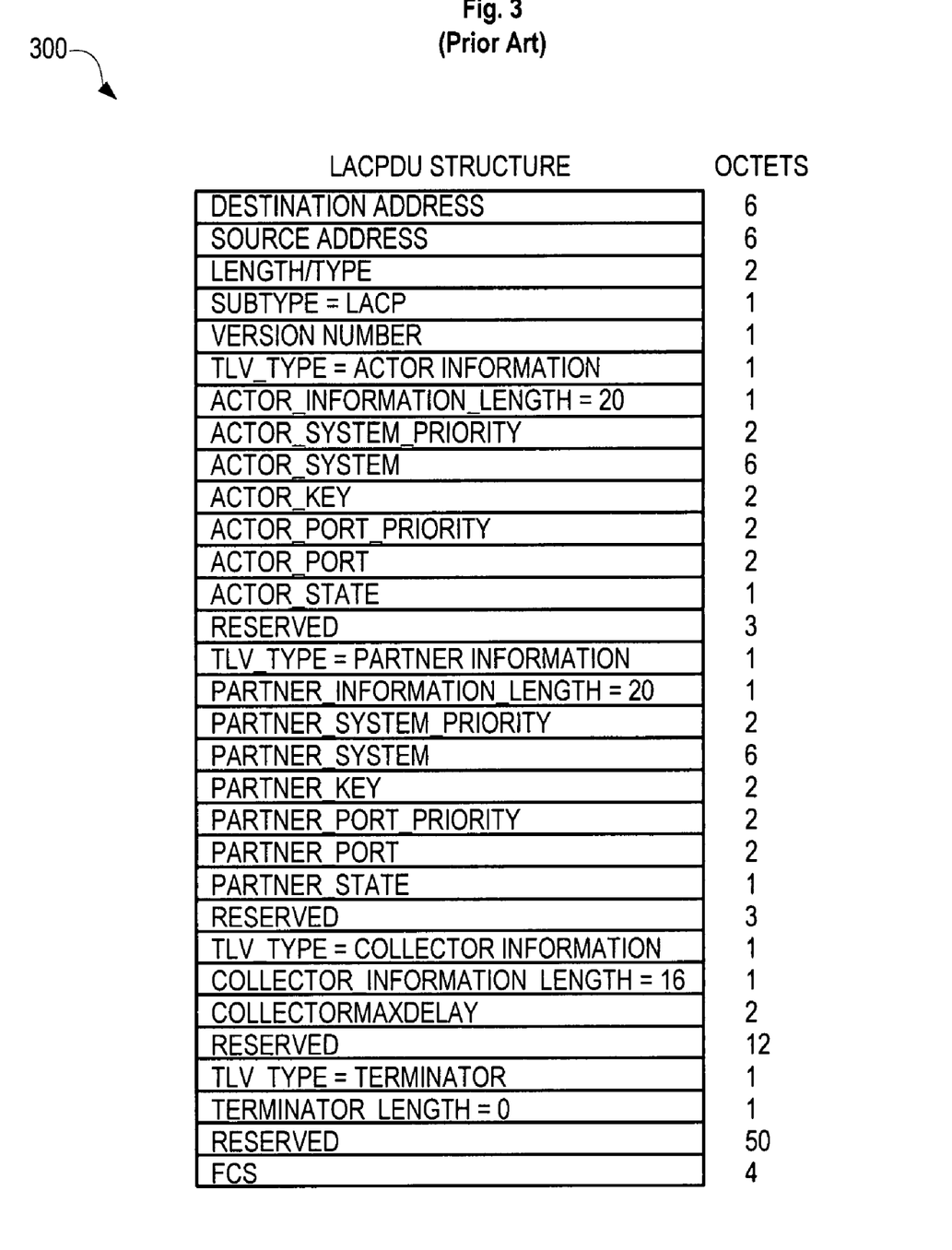
FIG. 3 shows the field assignments for a IEEE 802.3 link aggregation protocol data unit.

The frames exchanged between LACP 262 and its counterparts in peer systems each contain a LAC PDU, e.g., with a format 300 as shown in FIG. 3. The actor information and partner information contained in the LACPDU structure are used to establish and break link aggregations, with the "actor information" pertaining to the system sending the LACPDU, and the "partner information" indicating the state of the system receiving the LACPDU, as understood by the system sending the LACPDU.

The actor and partner information include a system ID, system priority, key, port ID, port priority, and state flags. The system ID is a globally unique identifier such as a MAC address assigned to the system. The system priority is a priority value assigned by the system administrator to the system. The key is a value assigned to the port by its system, and may be static or dynamic. The key is the same for each port on the system that is capable of aggregation with other ports transmitting that key. The port ID is a port number assigned by the system administrator to each port, and should be unique on the system. The port priority is a priority value assigned by the system administrator to the port, and should be unique among ports that are potentially aggregable. The state flags include LACP_Activity, LACP_Timeout, Aggregation, Synchronization, Collecting, Distributing, Defaulted, and Expired, and are defined as specified in IEEE 802.3-2005. In particular, the Synchronization bit is set TRUE when the link has been allocated to the correct Link Aggregation Group (LAG), the group has been associated with a compatible Aggregator, and the identity of the LAG is consistent with the System ID and Key transmitted by the port.

In operation, peered systems exchange LACPDUs to determine whether multiple ports that are aggregable to each other appear on both ends of the same link. To accomplish this, both endpoints calculate a Link Aggregation Group Identifier (LAG ID) for each participating port. The LAG ID combines actor and partner system priorities, system IDs, and keys. When the LAG IDs on two or more aggregable ports match, those ports are automatically assigned to the same LAG group, as long as both link endpoint systems make the aggregation.

BRIEF DESCRIPTION OF THE DRAWINGS

The present invention can be best understood by reading the specification with reference to the following Figures, in which.

DETAILED DESCRIPTION

According to the IEEE 802.3-2005 standard, the two switches shown in FIG. 1 may only aggregate point-to-point physical links connected directly to both switches. It has now been discovered that in at least some scenarios, it would be advantageous for two switches to aggregate links connected not to each other, but to a common service provider network, when those links are used for communication exclusively between the two switches. Instead of the service provider having to support two link aggregation groups, and ensure that the customer's links connect to ports that are actually aggregable by the service provider, the service provider only ensures that traffic between the two customer switches maps port-to-port on the service provider edge device or devices. Further, the edge device or devices pass link aggregation PDUs between the edge ports with the same port-to-port mapping, such that to the link aggregation sublayer on the two customer switches, their ports appear to be connected by physical links that are aggregable. Advantageously, when two sets of parallel customer links are aggregated in this manner, the links can operate, from the viewpoint of the customer, as if the two customer devices are connected point-to-point.

Figure 4:
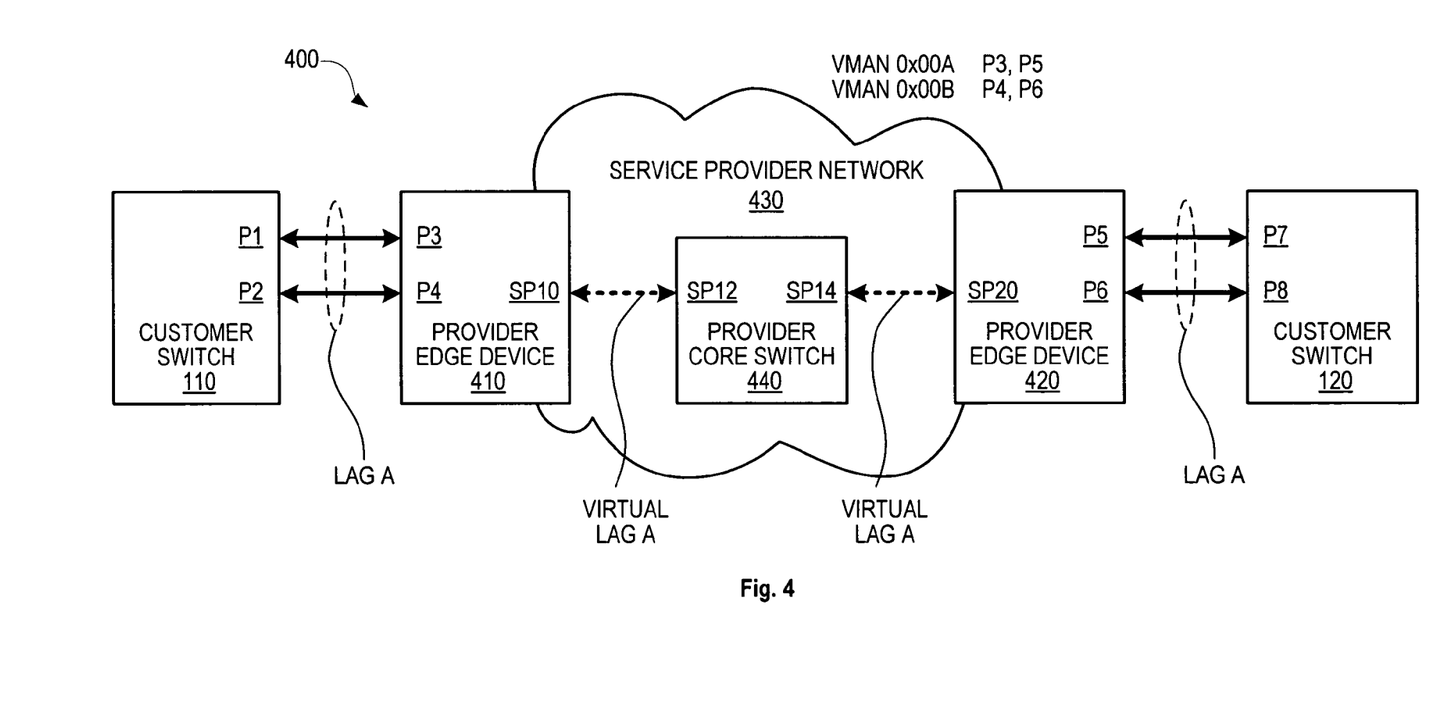
FIG. 4 illustrates a network configuration with two customer switches connected by multiple virtual aggregated physical links across a service provider network.

FIG. 4 contains a network diagram 400 for one embodiment. A customer switch 110 connects to a service provider network 430 through a first service provider edge device 410. Another customer switch 120 (from the same customer) also connects to the service provider network 430 through a second service provider edge device 420. The service provider network 430 typically provides a core network of switches, including, e.g., a service provider core switch 440, for passing traffic across the network, e.g., between the service provider edge devices 410 and 420. At least one port SP10 on edge device 410 has a path to a port SP12 on provider core switch 440, and at least one port SP20 on provider edge device 420 has a path to a port SP14 on provider core switch 440. These paths may be a point-to-point connection, or include other intermediate switches. Typically, service provider network 430 will contain additional edge devices and core switches, which have been omitted in FIG. 4 for clarity. Each provider edge device will generally have multiple redundant paths to the core of service provider network 430.

In some implementations, a customer uses the service provider network 430 to create a virtual bridged LAN (Local Area Network), e.g., as described in the IEEE 802.1ad-2005 standard, "Virtual Bridged Local Area Networks," incorporated herein by reference. In a virtual bridged LAN, the customer operates switches 110 and 120 as if they were on the same physical LAN, and is free to assign traffic to different Virtual LANs (VLANs) with different VLAN tags as desired by the customer. When the customer submits a data packet (one that is not defined as a packet to be consumed by the receiving device) to provider edge device 410, provider edge device 410 inserts an additional tag in the packet, a Virtual Metropolitan Area Network (VMAN) tag, and submits the packet to network 430 for delivery. The provider edge device that forwards the packet back to the customer (e.g., edge device 420) removes the VMAN tag. The value of the VMAN tag is assigned by the service provider to be unique to the customer. This allows multiple customers to use the same VLAN IDs and remain logically partitioned within the service provider network.

Customer switch 110 and service provider edge device 410 are depicted as connected by two physical links, one link between a port P1 on switch 110 and a port P3 on edge device 410, and another link between a port P2 on switch 110 and a port P4 on edge device 410. Typically, packets received by provider edge device 410 on either port P3 or port P4 would receive the same VMAN tag value.

It is possible that customer switch 110 and provider edge device 410 could aggregate the two links between themselves, e.g., as described in the background section of this disclosure. This link aggregation would allow both links to operate in parallel. Both switch 110 and edge device 410 must then provide LACP services, frame collection, and frame distribution, as described in the background section, and edge device 410 must assign the links to two ports P3, P4, that can be aggregated.

Customer switch 120 and service provider edge device 420 are also depicted as connected by two physical links, one link between a port P5 on edge device 420 and a port P7 on switch 120, and another link between a port P6 on edge device 420 and a port P8 on switch 120. Like with customer switch 110 and provider edge device 410, customer switch 120 and provider edge device 420 could aggregate the two links between themselves as described in the preceding paragraph.

Were these two separate link aggregations to be maintained as above, this would require that provider edge devices 410 and 420 devote resources to maintaining the link aggregations. Further, should one of the two link aggregations fail to aggregate, or aggregate a lesser number of links than the other, one side of the virtual bridged LAN would support a higher bandwidth than the other. This imbalance could result in undesirable latency, dropping, etc., experienced on the side with a lesser/no link aggregation.

In the embodiment shown in FIG. 4, these conditions are avoided by supporting a single "Virtual" Link Aggregation Group (VLAG) that extends from customer switch 110 to customer switch 120. Customer switches 110 and 120 construct and maintain the endpoints of a LAG A which appears to them to exist physically on two "links" from port P1 to port P7 and port P2 to port P8. Between these port pairs, service provider network 430 assures that customer data packets received on port P3 are forwarded out port P5 and vice versa, and customer data packets received on port P4 are forwarded out port P6 and vice versa. Likewise, service provider network 430 passes link aggregation protocol data units (LACPDUs) between these same edge port pairs, by transforming LACPDU packets into a format that can be passed across the service provider network (normally, LACPDU packets are consumed by the first device to receive them).

In this embodiment, separate VMAN identifiers are assigned to each pair of edge ports that the customer may like to aggregate. For instance, VMAN a can be assigned to port pair P3, P5, and VMAN b can be assigned to port pair P4, P6. Customer data packets received at one of these ports are assigned the appropriate VMAN identifier, as are LACPDU packets (the LACPDU packets receive further modification, as described below). Packets from port P3 and packets from port P4 can then take the same path, or different paths (e.g., with multiple spanning tree instances), to provider edge device 420, which uses the VMAN identifiers to parse the packets appropriately to ports P5 and P6.

Figure 5:
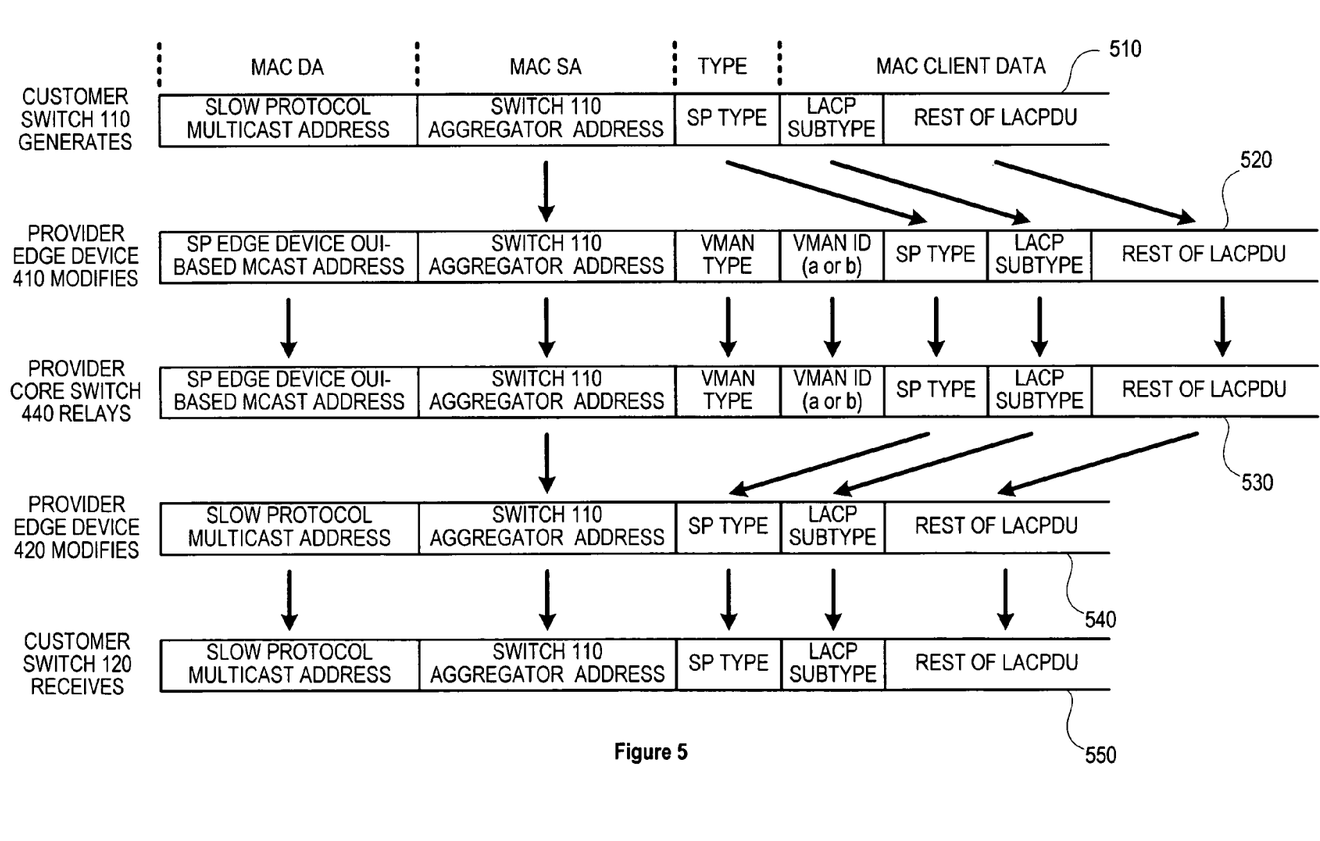
FIG. 5 illustrates the progression of a link aggregation protocol packet from a customer switch on one side of a service provider network to a customer switch on another side of the service provider network.

FIG. 5 shows the format of a LACPDU packet as it passes from customer switch 110 to customer switch 120. A link aggregation control protocol entity in customer switch 110 generates a standard LACPDU packet 510, as described in the background section. The Media Access Control Destination Address (MAC DA) is a slow protocol multicast address (0x0180C2000002) defined in the IEEE 802.3-2005 standard, Annex 43B. When combined with a slow protocol (SP) type (0x8809) and LACP subtype (0x01), packet 510 can be identified by the receiver as a LACPDU packet. The packet also contains a MAC SA (the switch 110 aggregator address) and the remaining LACPDU fields, e.g., as shown in FIG. 3. Customer switch 110 forwards LACPDU packet 510 to provider edge device 410 using the appropriate port (P1 or P2), as indicated by the link aggregation control protocol entity.

To conform to the IEEE 802.3-2005 standard, a receiver of LACPDU packet 510 is to either discard the packet (if the receiver does not support link aggregation) or consume the packet in a link aggregation protocol entity (if the receiver supports link aggregation). In this embodiment, the link aggregation protocol entity employed by provider edge device 410 is a virtual-link-aggregation protocol entity, e.g., the entity does not attempt to physically aggregate a link on which the LACPDU 510 is received. Instead, the entity determines whether a virtual-LAG port pairing is defined for the port on which the LACPDU packet 510 was received. If not, the packet is discarded. If so, the packet is modified according to the virtual-LAG port pairing.

When provider edge device 410's virtual-link-aggregation protocol entity determines that a virtual-LAG port pairing exists, the following modifications are made to LACPDU packet 510 to form a LACPDU packet 520. First, a VMAN tag is inserted in the packet. The tag consists of a type field and tag data, occupying four bytes inserted immediately after the MAC SA, such that the remainder of original packet 510 is shifted four bytes (the Frame Check Sequence (FCS) originally appended to the packet, not shown in FIG. 5, will require recalculation as a result of the insertion). The type field is filled with a VMAN type used by the service provider network (e.g., 0x9100 or 0x88A8). The tag data includes a 12-bit VMAN ID, which is set to the value assigned to port pair P3, P5 (e.g., 0x00A) when LACPDU packet 510 was received on P3, or the value assigned to port pair P4, P6 (e.g., 0x00B) when LACPDU packet 510 was received on P4.

Once provider edge device 410 inserts a tag in LACPDU 520, it no longer conforms to IEEE 802.3-2005, which requires that slow protocol frames remain untagged. Were LACPDU packet 520 to be submitted to the service provider network, the treatment it would receive would be uncertain. If all intermediate switches could be programmed/configured to recognize this format as a tunneled slow-protocol frame and forward it according to the VMAN ID, it would be possible to forward LACPDU packet 520 across network 430 with the slow protocol MAC DA. If some intermediate switches could not be programmed/configured as such, it is likely that these switches would consume and drop the packet as on an unrecognized type.

To allow LACPDU packet 520 to pass across network 430 in all circumstances, the slow protocol multicast address in the MAC DA is replaced with a multicast address based on an Organizationally Unique Identifier (OUI) assigned to the vendor of provider edge device 420. The vendor defines the OUI-based multicast MAC DA as reserved for tunneled LACPDU packets. When the service provider network 430 is configured for VLAG service, provider edge device 410 is instructed as to the value of the OUI MAC DA to insert in LACPDU packet 520. After insertion of the OUI-based multicast MAC DA, provider edge device 410 submits the packet 520 to service provider network 430.

When LACPDU packet 520 arrives at service provider core switch 440, the switch will either be of a type that recognizes the OUI-based multicast MAC DA as one reserved for tunneled LACPDU packets, or not. When the switch recognizes the OUI-based multicast MAC DA, it determines that it is not the endpoint associated with the VMAN ID, and forwards LACPDU packet 520 towards that endpoint (provider edge device 420) unchanged as LACPDU packet 530. When the switch does not recognize the OUI-based multicast MAC DA, it will see LACPDU packet 530 as just another VMAN-tagged packet, and forward the packet accordingly towards provider edge device 420 unchanged, as LACPDU packet 530.

When provider edge device 420 receives LACPDU packet 530, it recognizes its OUI-based multicast MAC DA and the presence of a VMAN ID that terminates at provider edge device 420. Provider edge device replaces the OUI-based multicast MAC DA with the slow protocol multicast address and removes the VMAN tag, and recalculates the FCS, forming a LACPDU packet 540 that should be identical to LACPDU 510 originally sent by customer switch 110. Provider edge device 420 forwards LACPDU packet 540 to customer switch 120, using the port (P5 or P6) assigned to the VMAN ID in the packet.

Customer switch 120 subsequently receives LACPDU packet 540 as LACPDU packet 550. When customer switch 110 originally sent the LACPDU packet on port P1, customer switch 120 will always receive the LACPDU packet on port P7. Likewise, when customer switch 110 originally sent the LACPDU packet on port P2, customer switch 120 receives the LACPDU packet of port P8. This allows customer switches 110 and 120, if they so choose, to negotiate and maintain a link aggregation as if a physical link existed between P1 and P7 and between P2 and P8.

Figure 6:
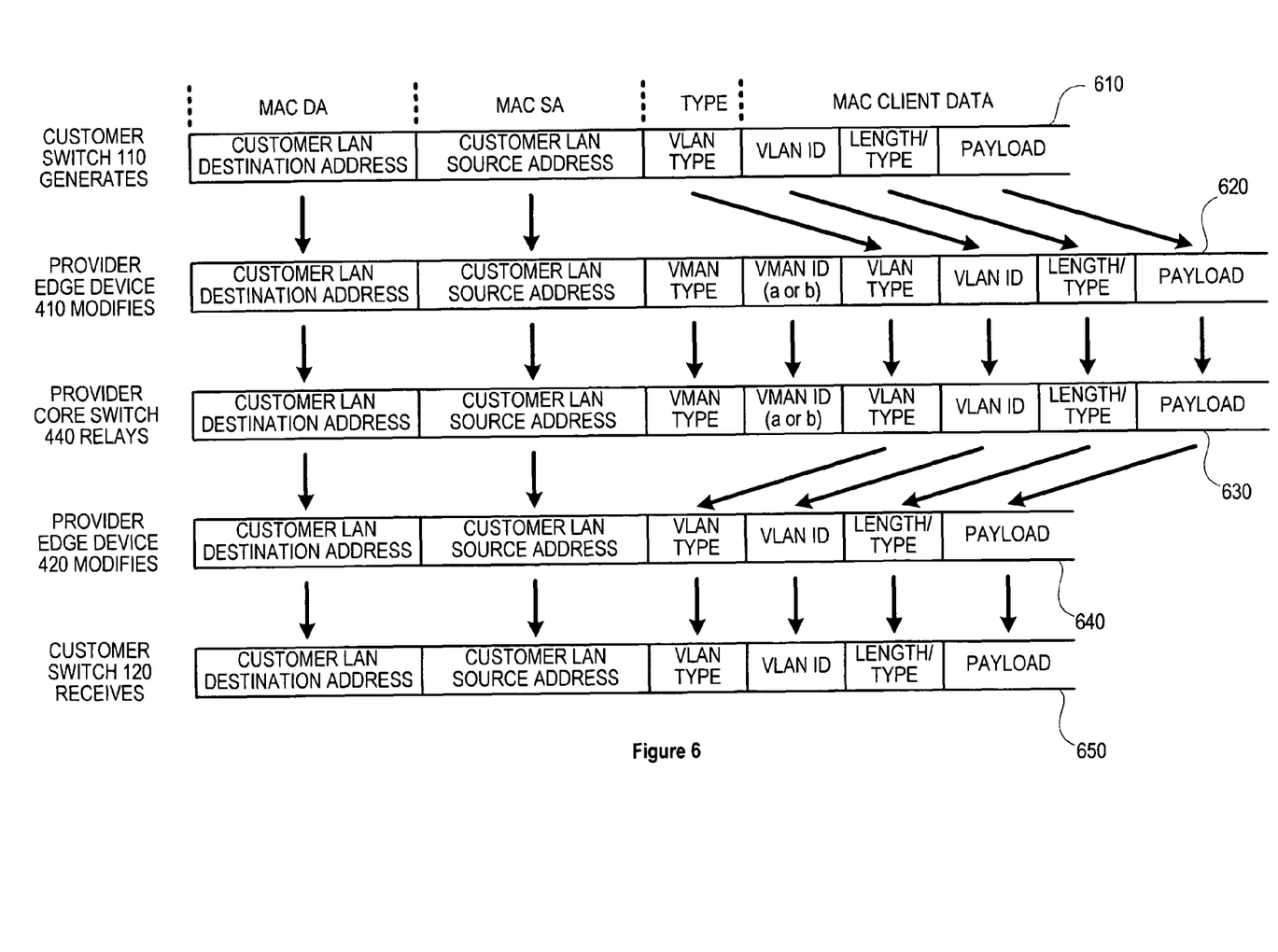
FIG. 6 illustrates the progression of a customer data packet from a customer switch on one side of a service provider network to a customer switch on another side of the service provider network.

FIG. 6 shows the format of a customer LAN packet as it passes from customer switch 110 to customer switch 120. Customer switch 110 generates (or forwards) a LAN packet 610 on either port P1 or port P2. LAN packet 610 has a MAC DA field containing a customer LAN destination address, a MAC SA field containing a customer LAN source address, a type field containing a standard VLAN type value (e.g., 0x8100), a corresponding customer VLAN ID, and whatever customer-specific payload is desired. Customer switch 110 forwards this packet to provider edge device 410 for delivery to a destination located on or behind customer switch 120.

Provider edge device 410 receives customer LAN packet 610 on either port P3 or port P4. Although customer LAN packet 610 is a VLAN-tagged packet, it is also possible that such a packet arrives at the provider edge device untagged; the edge device may either add such a tag, including a customer-defined default VLAN ID for the port received, or leave the packet without a VLAN tag, as desired. Provider edge device 410 creates a modified customer LAN packet 620 by inserting a VMAN tag in the packet. The tag consists of a type field and tag data, occupying four bytes inserted immediately after the MAC SA, such that the remainder of original packet 610 is shifted four bytes (the Frame Check Sequence (FCS) originally appended to the packet, not shown in FIG. 6, will require recalculation as a result of the insertion). The type field is filled with a VMAN type used by the service provider network (e.g., 0x9100 or 0x88A8). The tag data includes a 12-bit VMAN ID, which is set to the value assigned to port pair P3, P5 (e.g., 0x00A) when customer LAN packet 610 was received on P3, or the value assigned to port pair P4, P6 (e.g., 0x00B) when customer LAN packet 610 was received on P4.

Provider edge device 410 forwards customer LAN packet 620 toward provider edge device 420, e.g., out port SP10 to the intermediate provider core switch 440. Provider core switch 440 does not modify the packet, but forwards it based on its VMAN ID to provider edge device 420 as customer LAN packet 630.

Provider edge device 420 determines from the VMAN ID that customer LAN packet 630 is to be forwarded out an edge port (either P5 or P6). Provider edge device 420 removes the VMAN tag, recalculates the FCS, and forwards the modified customer LAN packet 640 out port P5 (if the VMAN tag was 0x00A) or port P6 (if the VMAN tag was 0x00B).

Customer switch 120 receives customer LAN packet 650, which should be identical to customer LAN packet 640. Due to the action of the service provider network 430, if the original customer LAN packet 610 was sent on port P1, customer LAN packet 650 will always arrive on port P7. Likewise, if the original customer LAN packet 610 was sent on port P2, customer LAN packet 650 will always arrive on port P8.

As is illustrated by the example presented in FIGS. 4-6, the described service provider network functionality creates a logical port agency between the customer's ports that appears to be a physical adjacency, allowing the customer to aggregate ports across the provider bridge network.

Figure 7:
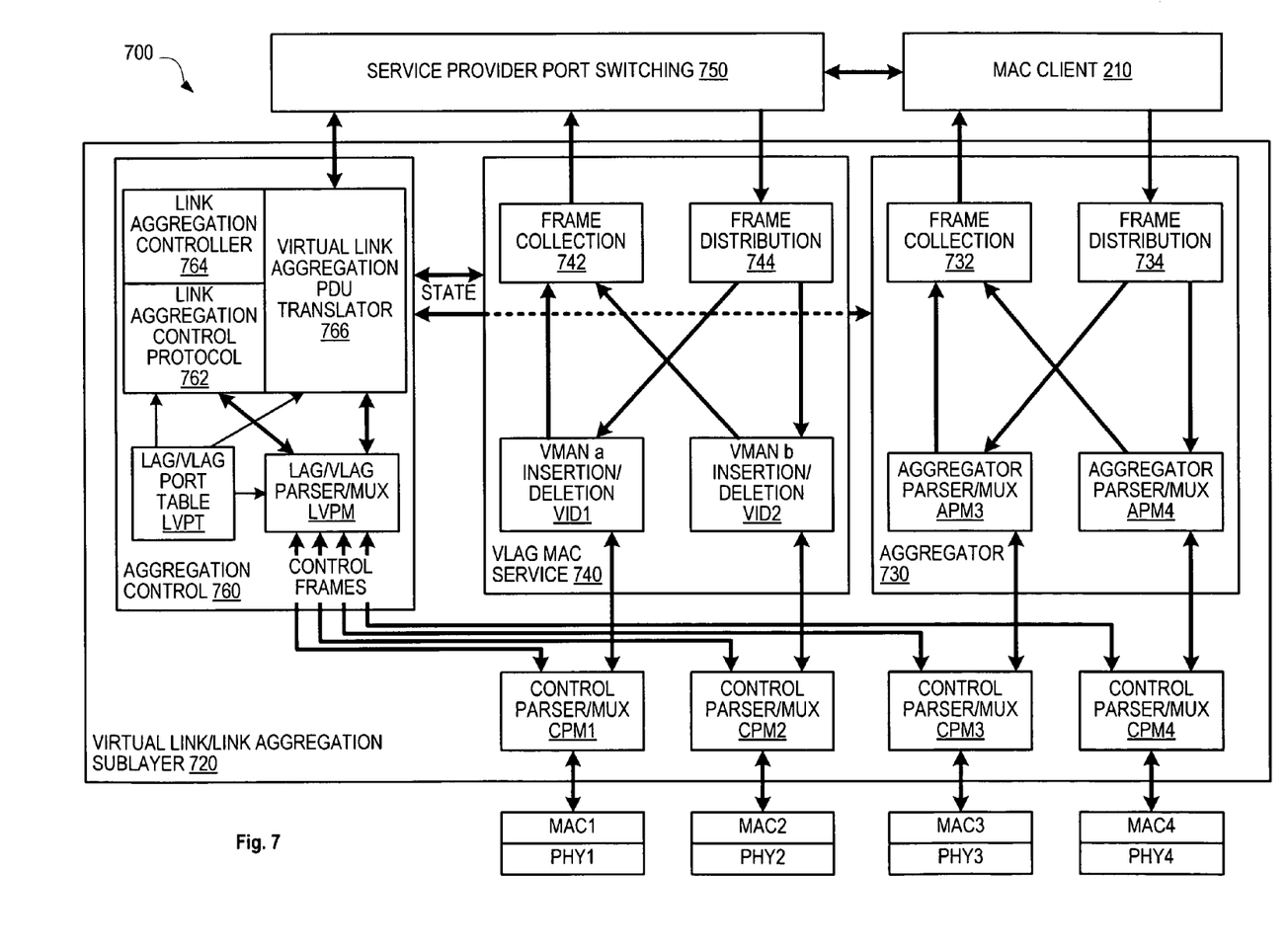
FIG. 7 illustrates a virtual link/link aggregation sublayer configuration for a service provider edge device.

FIG. 7 depicts one embodiment for a link aggregation protocol implementation 700 operating on a switch such as edge devices 410 and 420. As some customers may desire to implement traditional link aggregation, or the edge device may support traditional link aggregation on ports connected within the service provider network, link aggregation protocol implementation 700 is designed to support both traditional link aggregation and virtual link aggregation, as described above.

In FIG. 7, link aggregation protocol implementation 700 comprises four PHYs and corresponding MACs, PHY1-4 and MAC1-4, a virtual link/link aggregation sublayer 720, a MAC client 210, and service provider port switching 750. Customer connections are made to the ports corresponding to PHYs PHY1-4. MACs MAC1-4 interface with virtual link/link aggregation sublayer 720.

Service provider ports and/or other customer ports are reachable through service provider port switching 750. MAC client 210 serves as an interface to service provider port switching 750 for traditional link aggregation packet traffic. Virtual link/link aggregation sublayer 720 serves as an interface to service provider port switching 750 for virtual link aggregation packet traffic. Service provider port switching 750 supplies all customer packets received from the service provider network to MAC client 210, unless those packets contain a VMAN tag with a VMAN ID corresponding to a defined VLAG port. When a packet contains such a VMAN tag, it is supplied to VLAG MAC service 740 unless it contains the OUI-based multicast MAC DA indicating a tunneled LACPDU. Such packets are supplied instead to a virtual link aggregation PDU translation 766 within aggregation control 760. Although trunk port switching can make these decisions based on packet content, it is also possible for all packets to go through MAC client 210 and be parsed within the virtual link/link aggregation sublayer 720.

Within virtual link/link aggregation sublayer 720, the major service entities include four control parser/muxes CPM1-4, an aggregator 730, a VLAG MAC service 740, and aggregation control 760. Each will be addressed in turn.

Control parser/muxes CPM1-4 couple respectively to MACs MAC1-4 across respective IEEE 802.3 MAC service interfaces. For egress frames (transmitted by one of the PHYs), each control parser/mux passes frame transmission requests from aggregation control 760, and either aggregator 730 or VLAG MAC service 740, to the appropriate port. Customer data frame requests will come from aggregator 730 when the port corresponding to a control parser/mux is configured as a traditional LAG port. Customer data frame requests will come from VLAG MAC service 740 when the port corresponding to a control parser/mux is configured as a virtual LAG port. In FIG. 7, the customer ports corresponding to PHY1 and PHY2 are configured as virtual LAG ports, and the ports corresponding to PHY3 and PHY4 are configured as traditional LAG ports. Other customer port mixes are possible, and some customer ports may bypass the virtual link/link aggregation sublayer completely (not shown).

For ingress frames (received by one of the PHYs), each control parser/mux distinguishes LACPDUs from other frames, and passes the LACPDUs to aggregation control 760. All other frames either pass to aggregator 730, or to VLAG MAC service 740, depending on whether the port corresponding to a control parser/mux is configured as a traditional LAG port or a virtual LAG port.

Aggregator 730 functions as a prior art aggregator, with aggregator parser/muxes APM3 and APM4, frame collection 740, and frame distribution 750, as described in the background section.

VLAG MAC service 740 comprises a VMAN "a" insertion/deletion block VID1, a VMAN "b" insertion/deletion block VID2, a frame collection block 742, and a frame distribution block 744. Blocks VID1 and VID2 receive customer non-LACP frames respectively from control parser/muxes CPM1 and CPM2. Each inserts a VMAN tag with its assigned VMAN ID in the received frames, calculates a new FCS, and submits the VMAN-tagged frames to the frame collection block 742. Likewise, blocks VID1 and VID2 receive VMAN-tagged frames from frame distribution 744. Each block strips the VMAN tag, calculates a new FCS, and submits such frames respectively to control parser/mux CPM1 or CPM2 for forwarding to the customer. Frame collection 742 simply provides frame multiplexing/buffering for blocks VID1 and VID2, and provides frames to service provider port switching 750 for forwarding according to the VMAN ID. Service provider port switching 750 supplies customer-network-bound data frames to frame distribution 744. Frame distribution 744 distributes these frames to VID1 and VID2 for their respective VMAN IDs.

Aggregation control 760 comprises a link aggregation control protocol 762, a link aggregation controller 764, a virtual link aggregation PDU translator 766, a LAG/VLAG parser/mux LVPM, and a LAG/VLAG port table LVPT. Link aggregation control protocol 762 and link aggregation controller 764 function according to the description of the similar FIG. 2 functional blocks, although not all LACPDU traffic will originate or be consumed by link aggregation control protocol 762 (only the LACPDU traffic pertaining to the ports assigned to aggregator 730).

Virtual link aggregation PDU translator 766 provides ingress/egress LACPDU translation for virtual LAG ports, e.g., as described in conjunction with FIG. 5. Optionally, translator 766 can snoop the contents of LACPDU packets that it translates to track the state of any virtual link aggregation that is currently being supported.

LAG/VLAG parser/mux LVPM acts as an interface between the control parser/muxes CPM1-4 on one side, and the link aggregation control protocol 762 and virtual link aggregation PDU translator 766 on the other side. Each control parser/mux supplies LACPDU packets that it receives from the customer to parser/mux LVPM. Parser/mux LVPM sends LACPDU packets from CPM1 and CPM2 to virtual link aggregation PDU translator 766, and sends LACPDU packets from CPM3 and CPM4 to link aggregation control protocol 762. LAC protocol 762 supplies LACPDU packets that it generates to parser/mux LVPM. Virtual link aggregation PDU translator 766 supplies outgoing LACPDU packets that it translates to parser/mux LVPM. Parser/mux LVPM takes these packets and distributes them to the appropriate control parser/muxes.

LAG/VLAG port table LVPT contains port assignment data, e.g., as configured by a network administrator. The network administrator provisions port table LVPT to indicate, for each port controlled by virtual link/link aggregation sublayer 720, whether the port supports traditional link aggregation or virtual link aggregation. For virtual link aggregation ports, port table LVPT also contains translation data such as the ingress and egress VMAN IDs for that port, and the OUI-based multicast MAC destination addresses for ingress and egress LACPDUs. Link aggregation control protocol 762, virtual link aggregation PDU translator 766, and LAG/VLAG parser/mux LVPM references port table LVPT to perform their respective operations. The port table information can also be shared with the control parser/muxes, VLAG MAC service 740, and service provider port switching 750 as needed to configure those blocks.

The physical implementation of the link aggregation control protocol will depend on the switch architecture. In one preferred implementation, ingress or egress packet processing hardware performs VMAN tag insertion/deletion, with the appropriate VMAN operations stored as packet modification instructions associated with customer data traffic passing through the customer ports. Such hardware can detect LACPDU packets and pass these on a control plane to a software process that performs LACPDU translation. Optionally, LACPDU packets associated with a VLAG customer port can also be translated by the ingress or egress packet processing hardware, with the appropriate VMAN and MAC DA revisions stored as packet modification instructions associated with LACPDUs passing through VLAG customer ports.

Figure 8:
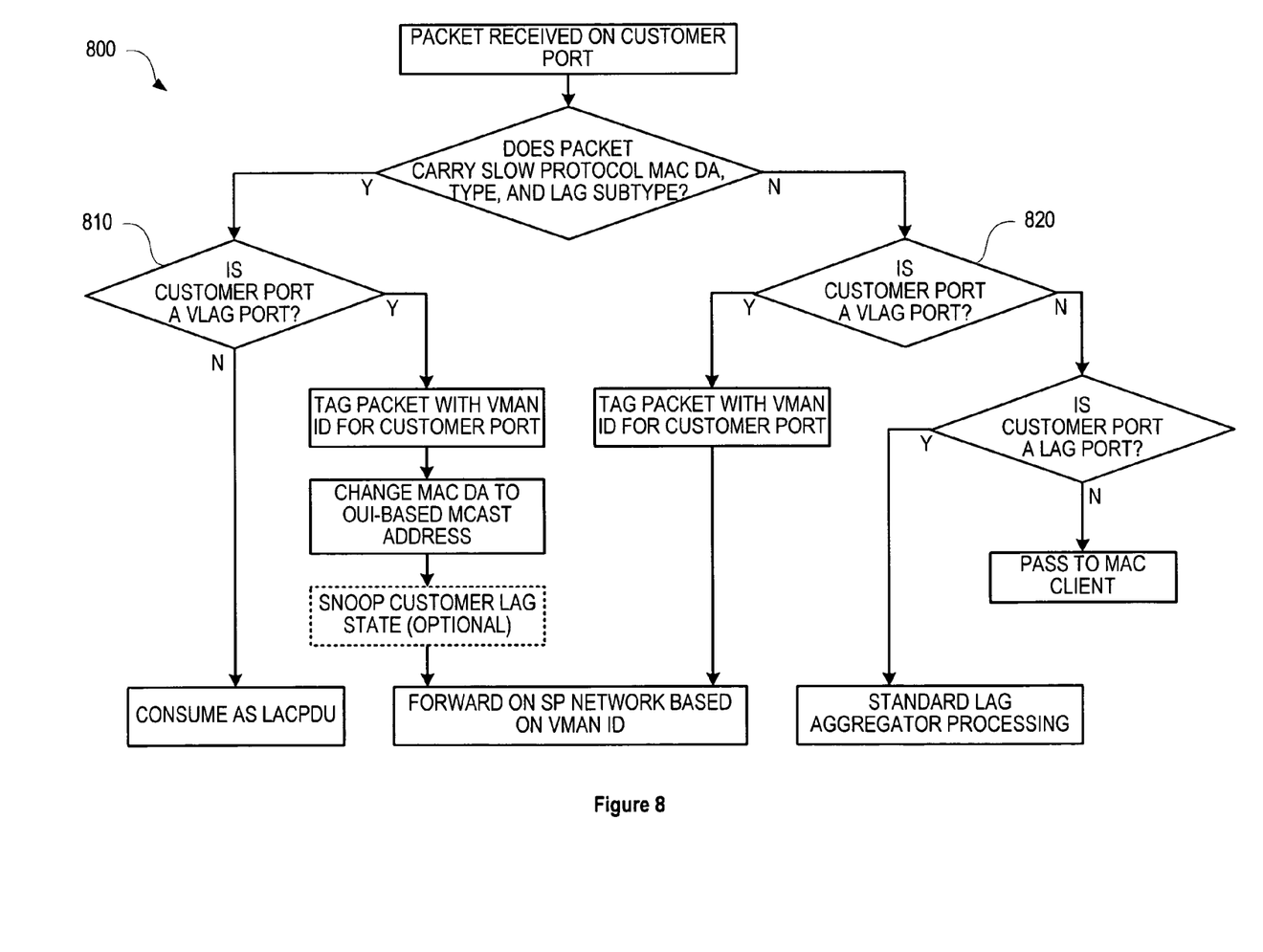
FIG. 8 contains a flowchart for processing packets received at a customer port of a service provider edge device.

FIG. 8 contains a flowchart 800 for one embodiment of customer port ingress processing, showing general decisions and operations that are performed in hardware, software, or a combination of hardware and software. When a packet arrives at a customer port, LACPDU packets (carrying a slow protocol MAC DA, a slow protocol type, and a LAG subtype) are filtered and passed to decision block 810, and customer data packets are passed to decision block 820.

Decision block 810 determines whether the customer port on which a LACPDU packet was received is a VLAG port. When it is not, the LACPDU is consumed by a traditional link aggregation protocol. When the receive port is a VLAG port, the LACPDU is tagged with the VMAN ID associated with the customer port, the MAC DA is changed to an OUI-based multicast destination address, and the packet is potentially snooped. The translated LACPDU packet is then forwarded on the service provider network based on the assigned VMAN ID.

Decision block 820 likewise determines whether the customer port on which a customer data packet was received is a VLAG port. When it is not, the customer data packet is either passed to a MAC client or to a standard link aggregator for processing, depending on whether the customer port is a LAG port. When the receive port is a VLAG port, the customer data packet is tagged with the VMAN ID associated with the customer port, and then forwarded on the service provider network based on the assigned VMAN ID.

Figure 9:
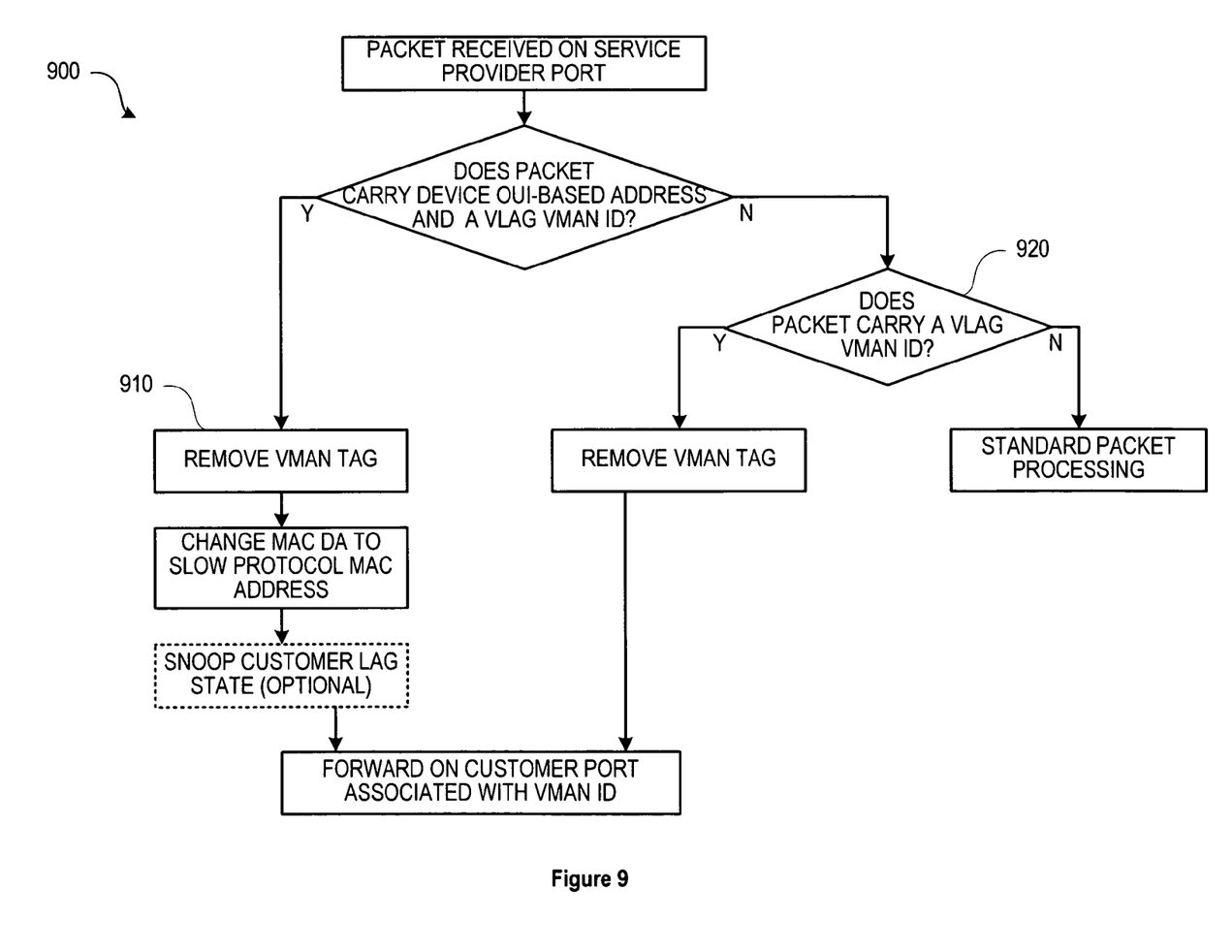
FIG. 9 contains a flowchart for processing packets received at a service provider port of a service provider edge device.

FIG. 9 contains a flowchart 900 for one embodiment of customer port egress processing, showing general decisions and operations that are performed in hardware, software, or a combination of hardware and software. Many of these functions may be performed in a given implementation in an ingress processor, or in an egress processor. When a packet arrives at a service provider port, tunneled LACPDU packets (carrying a OUI-based multicast MAC DA associated with a tunneled LACPDU) and a VLAG VMAN ID associated with the switch are filtered and passed to block 910, and other packets are passed to decision block 920.

Beginning with block 910, tunneled LACPDU packets are translated by removing the VMAN tag, changing the MAC DA to the slow protocol MAC address, and potentially snooping the packet. The translated LACPDU packet is then forwarded on the customer port associated with the VMAN ID.

Decision block 920 determined whether a packet carries a VLAG VMAN ID that terminates on the switch. When it does not, the switch applies standard packet processing/forwarding. When the packet carries a VLAG VMAN ID that terminates on the switch, the switch removes the VMAN tag and forwards the packet on the customer port associated with the VMAN ID.

Figure 10:
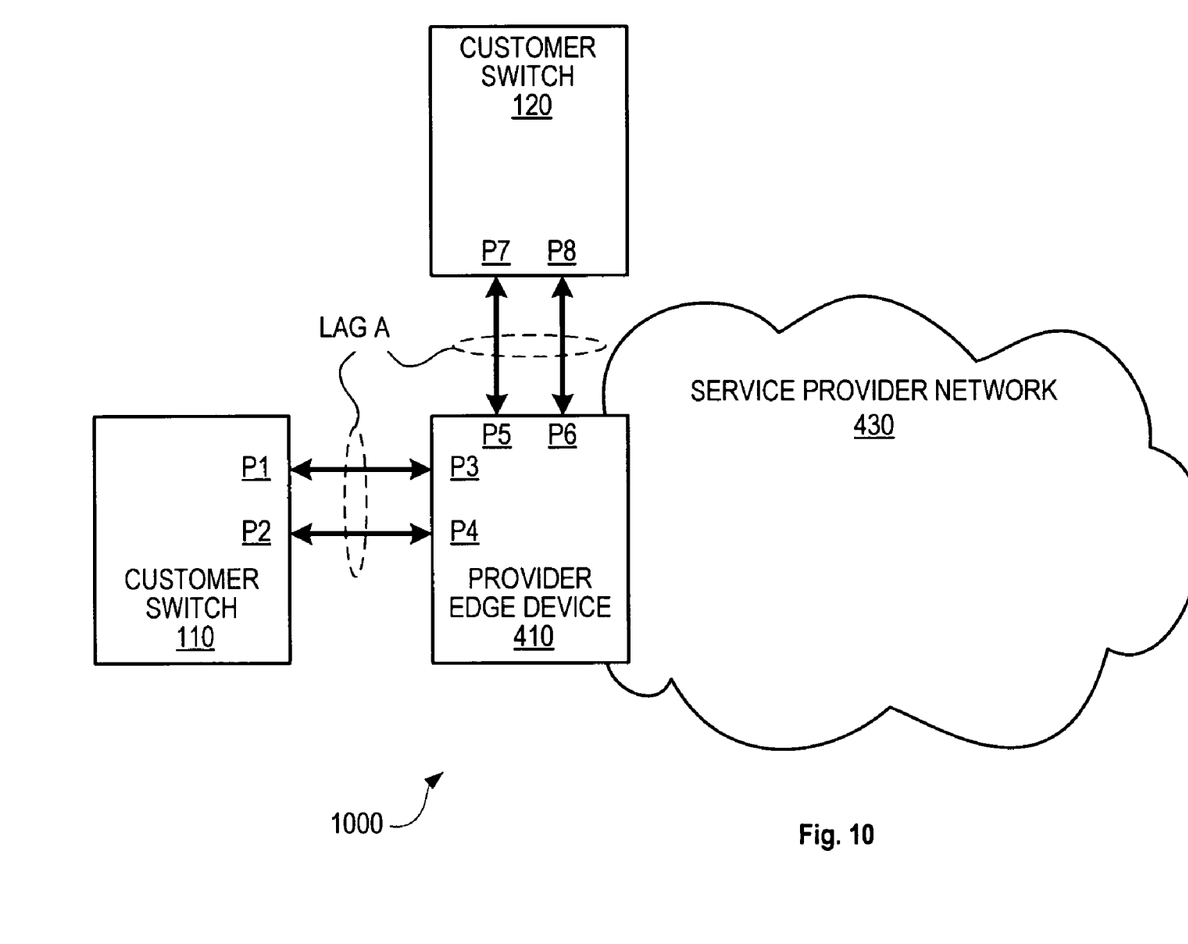
FIG. 10 illustrates a network configuration with two customer switches connected by multiple virtual aggregated physical links across a service provider edge device.
Figure 11:
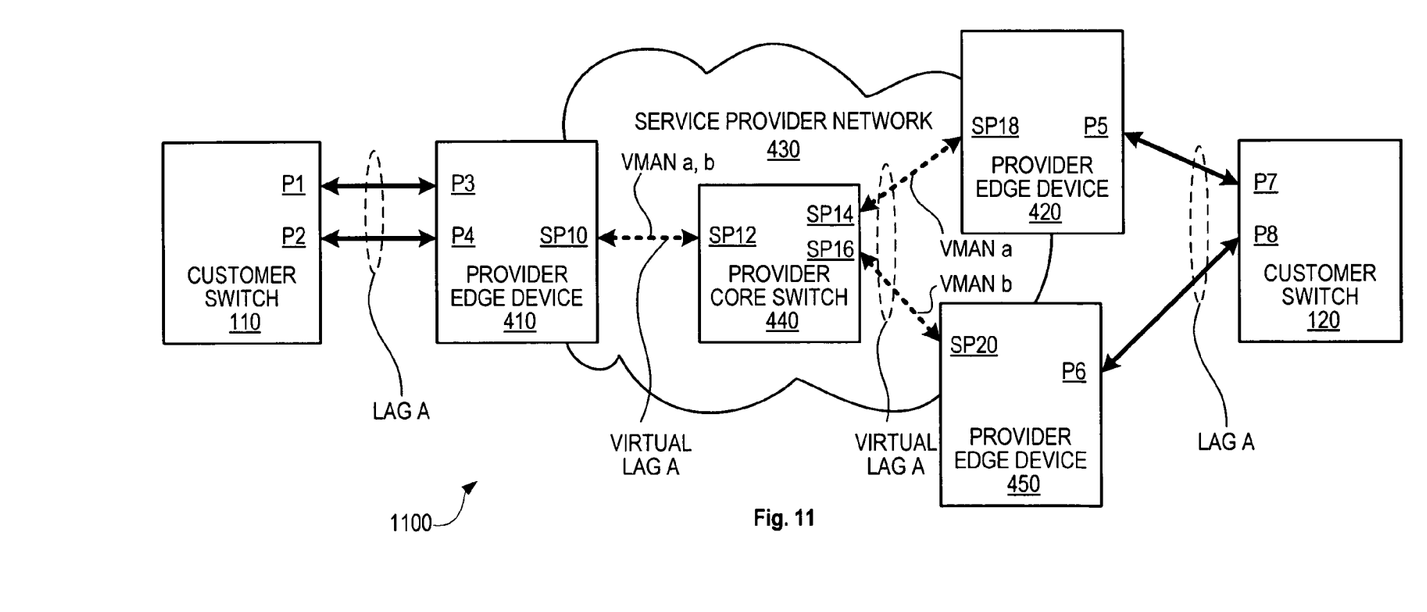
FIG. 11 illustrates a network configuration with two customer switches connected by multiple virtual aggregated physical links, wherein for one of the customer switches the aggregated links do not connect to the same service provider edge device.

Due to the "virtual" nature of the link aggregation within the service provider network 430, there are few constraints as to where in the service provider network the customer ports may reside. FIGS. 10 and 11 give several alternate port configuration examples. The implementation 1000 shown in FIG. 10 implements a virtual LAG A through a single provider edge device 410. Customer packets arriving at P3 and P4 are forwarded on ports P5 and P6, respectively, such that the customer can maintain a link aggregation between its port pairs P1, P7 and P2, P8. Edge device ingress processing and egress processing can insert/remove VMAN IDs as described above, or optionally bypass this step when the switch can distinguish VLAG ports paired on the same switch. LACPDUs arriving at one customer port are forwarded on the paired port.

The implementation 1100 shown in FIG. 11 implements a virtual LAG A between two customer switches 110 and 120, using three edge devices 410, 420, and 450. Customer switch 110 and provider edge device 410 connect as described in FIG. 4. Customer switch 120, however, connects through one link to a port P5 on provider edge device 420, and through another link to a port P6 on provider edge device 450. A provider core switch 440 distinguishes packets for a VMAN "a" and a VMAN "b", with the former forwarded to a port SP18 on provider edge device 420, and the latter forwarded to a port SP20 on provider edge device 450.

Although not shown in a figure, the VMAN-tagged virtual LAG packets can also pass through a physical link aggregation somewhere on their traverse of the service provider network. This may result in reordering of packets from different flows within each VMAN ID flow, depending on the rules used to distribute packets among the LAG members, but each flow will remain associated with its VMAN ID-assigned egress port and the packets in each flow will not be rearranged. Accordingly, no violation of the link aggregation protocol will occur on either the physical link aggregation in the service provider network or the virtual link aggregation between the customer switches.

Those skilled in the art will appreciate that the embodiments and/or various features of the embodiments can be combined in other ways than those described. For instance, other equivalent methods can be selected for communicating link aggregation PDUs across the service provider network. The method selected for configuring the virtual link aggregation port assignment is outside the scope of this disclosure, but could for example include manual configuration by a network administrator and/or configuration based on customer requests using a protocol designed to manage virtual link aggregations.

IEEE 802.1ad-2005-compliant VMAN tags have been used to illustrate various embodiments. The principles described herein can be included in other tagging schemes. No limitation to a specific approach is suggested or intended by this disclosure.

Although the specification may refer to "an", "one", "another", or "some" embodiment(s) in several locations, this does not necessarily mean that each such reference is to the same embodiment(s), or that the feature only applies to a single embodiment.

The invention claimed is:

1. A method of providing virtual link aggregation in a network, comprising:

aggregating first and second sets of multiple physical links, wherein each physical link of the first set of multiple physical links connects at a first end to a first customer packet device, wherein each physical link of the second set of multiple physical links connects at a first end to a second customer packet device, and wherein the second end of each physical link of the first and second sets of multiple physical links connects to a network that is intermediate to the two customer packet devices;

the network maintaining a pairing between each physical link in the first set of multiple physical links and a corresponding physical link in the second set of multiple physical links;

the network using the pairing to forward a link aggregation packet between the first and second customer packet devices such that the link aggregation packet arriving at the network on one of the physical links in the first set of multiple physical links is directed to exit the network at the corresponding paired physical link in the second set of multiple physical links; wherein a different VMAN tag value is assigned to each of the physical link pairs maintained by the network between the first set of multiple physical links and the second set of multiple physical links;

a first network element, connected to one of the pairs of physical links in the first set of multiple physical links on which the link aggregation packet was received, replacing a packet destination address with a second destination address that allows the link aggregation packet to pass through the network, and inserting a VMAN tag in the link aggregation packet, wherein the VMAN tag comprises the particular VMAN tag value assigned to the physical link on which the link aggregation packet was received by the network element;

the first network element forwarding the link aggregation packet toward a second network element connected to one of the physical links in the second set of multiple physical links paired with the physical link in the first set of multiple physical links on which the link aggregation packet was received; and the second network element, connected to the one of the physical links in the second set of multiple physical links that is paired with the first set of multiple physical links, replacing the second destination address with a link aggregation destination address, removing the VMAN tag from the link aggregation packet, and forwarding the link aggregation packet on the physical link in the second set of multiple physical links that is paired with the physical link in the first set of multiple physical link on which the aggregation packet was received.

2. The method of claim 1, wherein the network using the pairing to forward data packets between the first and second customer packet devices comprises:

a first network element, connected to the physical link on which a data packet was received, inserting a VMAN in the data packet, wherein the VMAN tag comprises a particular tag value associated with the physical link on which the data packet was received by the network element;

the first network element forwarding the data packet toward a network element connected to the other physical link paired with the physical link on which the data packet was received; and the network element connected to the other physical link of the pairing removing the VMAN tag from the data packet and forwarding the data packet on the other physical link of the pairing.

3. The method of claim 2, wherein the first network element is also the network element connected to the other physical link of the pairing.

4. The method of claim 2, wherein each of the first set of multiple physical links connect to the first network element, and each of the second set of multiple physical links connect to the network element connected to the other physical link of the pairing.

5. The method of claim 4, wherein the first network element is also the network element connected to the other physical link of the pairing.

6. The method of claim 2, wherein the second set of multiple physical links connects to a group of at least two network elements, with at least one link of the second set of multiple physical links connected to each network element in the group.

7. The method of claim 2, wherein the network using the pairing to forward data packets between the first and second packet devices further comprises an intermediate network device receiving the data packet from the first network element and forwarding the data packet toward the network element connected to the paired physical link, based on the VMAN tag value inserted by the first network element.

8. The method of claim 2, wherein the VMAN tag value is part of the pairing maintained by the network.

9. The method of claim 1, wherein the second destination address comprises an Organizationally Unique Identifier recognized by the network element connected to the other physical link of the pairing.

* * * * *